US006722617B2

(12) United States Patent
Wilfer

(10) Patent No.: US 6,722,617 B2
(45) Date of Patent: Apr. 20, 2004

(54) MUSICAL-INSTRUMENT STAND

(76) Inventor: Hans-Peter Wilfer, Zum Hackerhof 5, D-08258 Markneukirchen (DE)

( * ) Notice: Subject to any disclaimer, the term of this patent is extended or adjusted under 35 U.S.C. 154(b) by 0 days.

(21) Appl. No.: 10/303,249

(22) Filed: Nov. 25, 2002

(65) Prior Publication Data
US 2004/0016856 A1 Jan. 29, 2004

(30) Foreign Application Priority Data

Jul. 24, 2002 (EP) .............................................. 02016557

(51) Int. Cl.[7] .............................................. F16M 11/32
(52) U.S. Cl. ................................... 248/163.1; 248/465
(58) Field of Search ............................ 248/163.1, 165, 248/166, 168, 170, 188.6, 465, 464, 462, 460, 440; 403/87, 84, 119, 326; 84/453, 327, 387 A, 329, 280

(56) References Cited

U.S. PATENT DOCUMENTS

| | | | | | |
|---|---|---|---|---|---|
| 5,205,526 A | * | 4/1993 | Deutsch | ...................... | 248/449 |
| 5,713,547 A | * | 2/1998 | Yu | .............................. | 248/166 |
| 5,836,552 A | * | 11/1998 | Yu | .............................. | 248/166 |
| 6,007,032 A | * | 12/1999 | Kuo | ......................... | 248/185.1 |
| 6,113,040 A | * | 9/2000 | Yu | .............................. | 248/166 |
| 6,412,742 B1 | * | 7/2002 | Yu | .............................. | 248/434 |
| 6,484,977 B1 | * | 11/2002 | Yu | .......................... | 248/125.1 |
| 6,533,228 B1 | * | 3/2003 | Yu | .............................. | 248/166 |

FOREIGN PATENT DOCUMENTS

| | | | | |
|---|---|---|---|---|
| DE | 4437200 A1 | * | 4/1996 | .......... G10G/05/00 |
| GB | 2276314 A | * | 9/1994 | .......... G10G/05/00 |

* cited by examiner

Primary Examiner—Leslie A. Braun
Assistant Examiner—A. Joseph Wujciak, III
(74) Attorney, Agent, or Firm—Sidley Austin Brown & Wood, LLP

(57) ABSTRACT

The invention relates to a musical-instrument stand, in particular for guitars, and comprises a first side and a second side, each of which defines a lower part and an upper part. The lower parts of the first and the second sides each comprises foot elements or setting the stand on a floor surface. In their upper parts, the first and the second sides respectively comprises a first and a second joint element, which together define a pivot joint in order that the sides can be pivoted with respect to one another about a predetermined axis of rotation. A releasable catch is also provided in the region of the joint elements to lock the guitar stand in at least one pivot position.

13 Claims, 3 Drawing Sheets

MUSICAL-INSTRUMENT STAND

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a stand for a musical instrument, in particular for a guitar.

BACKGROUND OF THE INVENTION

A musical-instrument stand of this kind has previously been disclosed in the patent GB 2 276 314 A. This known guitar stand is relatively complicated, being designed with a large number of parts that can move with respect to one another. It would be desirable for a novel guitar stand to be easier to set up than is the known stand, while simultaneously ensuring that the erected stand will remain stable.

Another guitar stand of this generic kind is known from the patent DE 44 37 200 C2. The procedure required to set up this guitar stand is also cumbersome, because after first and second sides have been pivoted so as to be in position for erection, a connecting iron in the region of a foot elements must be put into an effective position between the first and second sides. This introduces an additional complication into the erection process.

BRIEF SUMMARY OF THE INVENTION

The object of the present invention is to provide a musical-instrument stand which, in comparison to the known state of the art, can be set up considerably more simply and moreover is comparatively easy to manufacture.

Hence, according to the present invention there is provided a musical-instrument stand, in particular for a guitar, comprising a first side and a second side, each of which defines a lower part and an upper part; foot elements provided on the lower part of the first and the second sides for supporting the stand on a floor surface; first and second joint elements located in the upper parts of the first and the second sides respectively and together defining a pivot joint that allows the first and the second sides to be pivoted with respect to one another about a predetermined axis of rotation; and a releasable catch located in the region of the first and second joint elements and operable to lock the stand in at least one pivot position.

Preferably, the two sides of the musical-instrument stand are arrested in a predetermined rotational position solely by the catch, which is disposed in the region of the joint elements. A musical-instrument stand so constructed can be set up and folded together in a considerably less complicated manner than those of the prior art and nevertheless remains simple to manufacture.

In an advantageous further development musical-instrument stand in the form of a guitar stand designed as proposed in the invention can also be fixed in a plurality of different rotational positions. This is achieved by constructing the catch so that a plurality of engagement positions is defined, which are preferably spaced equal distances apart, so that the apparatus can be fixed in corresponding angular positions.

With the measures proposed in the invention a guitar stand can be created that is especially easily transported, is lightweight and can be rapidly set up and taken down. It can be made particularly compact for transport by rotating the first and second sides into a position such that they are substantially parallel to one another in a resting position and at the same time a minimal distance apart. The result is an extremely flat unit that can readily be stored in order to be transported.

In a further embodiment there are provided, in addition to the catch, means for limiting the angle of rotation in the region of the joint elements, in particular at the catch or at the bearing elements of the pivot joint, which make it impossible for the stand to be opened out beyond a predetermined maximal opening angle. In principle the construction of the catch in itself ensures that the musical-instrument stand is sufficiently stable when arrested in a selected pivot-angle position. The pivot-angle-limiting means provides an additional, insurmountable barrier to opening beyond a specified maximal angle of rotation.

Preferably, the catch comprises a latch which is constructed and oriented such that it extends along an arc of a circle concentric with the axis of rotation. In this case the catch can define several engagement positions, each of which can be accessed by means of an associated catch counterpart when the sides are pivoted.

Preferably also, the catch comprises a first part defining a channel with latch recesses and a second part comprising a latch that is guided in the channel and provided with latch projections.

In an especially preferred embodiment the catch comprises a first part defining a channel with latch recesses and a second part comprising a latch that is guided in the channel and provided with latch projections. This design achieves a very well-defined engagement. Furthermore, such a design can reinforce the stability of the joint.

Preferably also, the catch is spaced apart from the axis of rotation of the pivot joint by less than 20 cm, preferably less than 15 cm. The result is a relatively simple, ergonomic structure of the musical-instrument stand. The musical-instrument stand requires fewer movable parts than are provided in the state of the art as presented above. In a specific embodiment the latch projections engage in the recesses of the channel in a direction radial to the axis of rotation of the pivot joint.

In addition or in the alternative, latch projections are provided that engage in the latch recesses of the channel in a direction parallel to the axis of rotation.

In one embodiment, latch recesses are provided at two side surfaces of the channel so that corresponding latch projections at associated side surfaces of the latch can engage in the said recesses. With appropriate dimensioning of the channel, the force tending to press the latch projections at the side surfaces of the latch towards the recesses in the channel is always substantially the same, so that in this embodiment, which involves an inserting or enclosing engagement of the latch projections in the recesses, well-defined holding forces are ensured even after the musical-instrument stand has been in use for many years.

Preferably also, the catch is made predominantly or entirely of plastics material. To construct the catch of plastics material proves to be useful and economical during manufacture. At the same time, a catch made of plastic provides simple and reliable handling.

Preferably also, each of the first and second sides defines an indented region, the two of which indented regions together define a support on which a musical instrument may be stood. Therefore, even to support the instrument no additional, separate components are needed, so that the musical-instrument stand is altogether handy to use, lightweight and reliable in construction and employment.

An embodiment of the present invention will now be described by way of example with reference to the attached drawings.

DETAILED DESCRIPTION OF THE INVENTION

Figure 1:
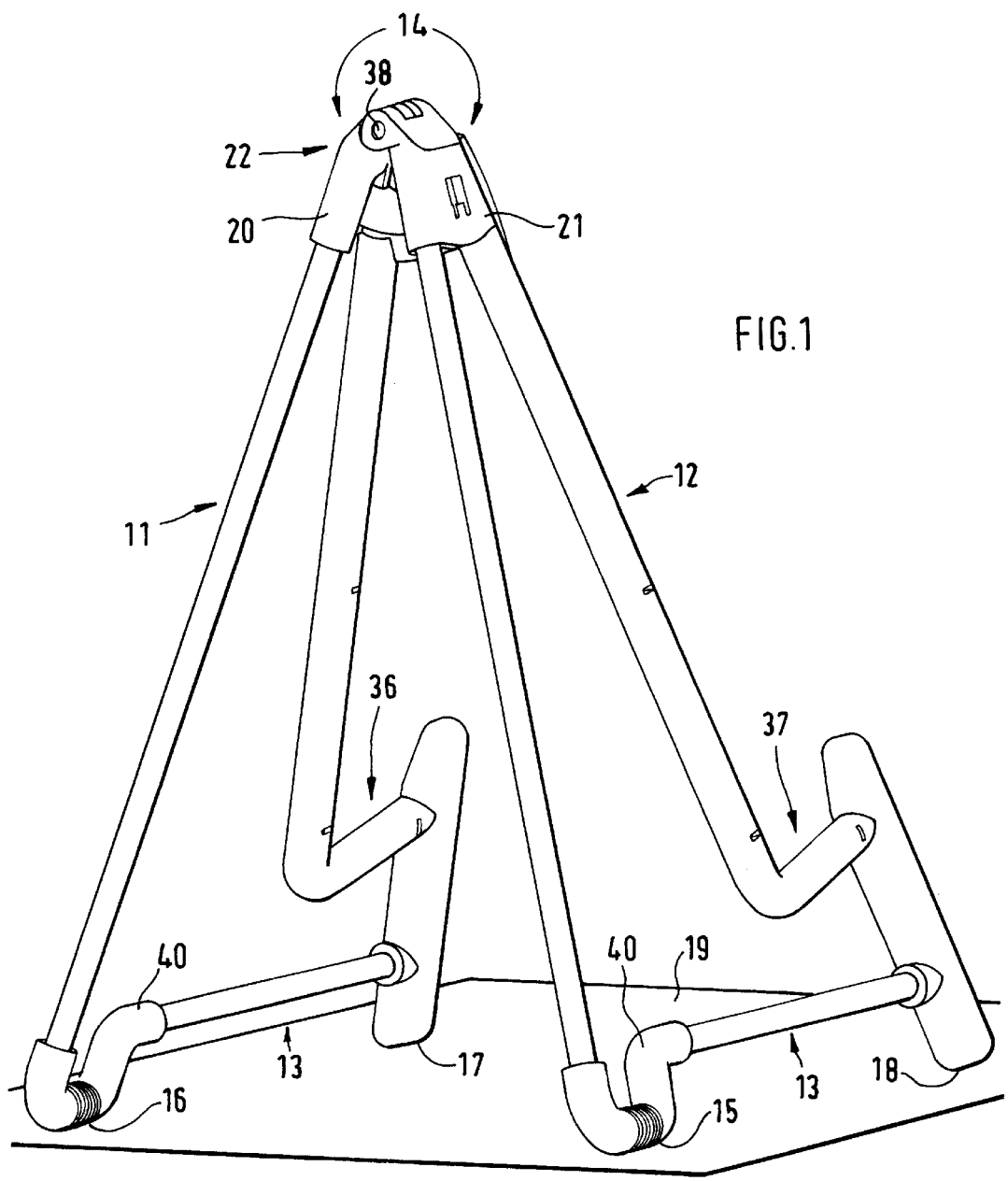
FIG. 1 is a perspective view of an embodiment of a musical-instrument stand in accordance with the present invention and in this particular embodiment designed as a guitar stand.

In the embodiment shown in FIG. 1, the musical-instrument stand comprises a first side 11 and a second side 12. The first side 11 and the second side 12 each have a lower part 13 and an upper part 14. In this embodiment, the first and second sides 11, 12 each comprise a tubular frame that is approximately triangular in shape and that defines an indented region 36, 37, which when the musical-instrument stand is in an opened-out position, as will be described in detail below, together define a support for a musical instrument, in this case in particular for a guitar.

The first and second sides 11, 12 each comprise on their lower parts 13 foot elements 15 to 18, which can either be integrally formed as part of the basic tubular frame or be formed by separate components. The foot elements 15 to 18 are designed to rest on a floor surface 19 and can each be provided with a rubberized cover 40 to improve adherence and simultaneously compensate to a slight extent for unevenness in the floor and/or serve as an impact absorber.

The first and second sides 11, 12 comprise at their upper parts 14 first and second joint elements 20, 21 respectively. The first joint element 20, on the first side 11, together with the second joint element 21 and a joint shaft 38, which here is provided as a separate component, form a joint 22 pivotable about an axis of rotation S, as a result of which an axial pivotability is defined between the first and second sides 11 and 12. The joint shaft 38 in the present embodiment is a separate component; appropriately constructed, however, with corresponding modification of the element serving as counterpart in the joint, it could instead be made an integral part of the first or the second joint element 20, 21. In this case the counterpart joint element could be fixed in position, for example, by clipping it into place by means of a snap-in connection.

In the illustrated embodiment presented here, a channel 24 is formed integrally with the first joint element 20 and, when the musical-instrument stand is in its assembled state, extends around a latch 23 formed integrally with the second joint element 21. The latch, 23 and channel 24 constitute a catch means with various discrete engagement positions 25 to 29 that define the various joint-angle positions that can be occupied, in each of which the musical-instrument stand is kept in a predetermined angular position by a predetermined retaining force. When the predetermined retaining force is overcome, the engagement at the fixed position 25 to 29 can be released and the pivot angle of the musical-instrument stand changed, for example the stand can be opened further or folded shut.

Figure 2:
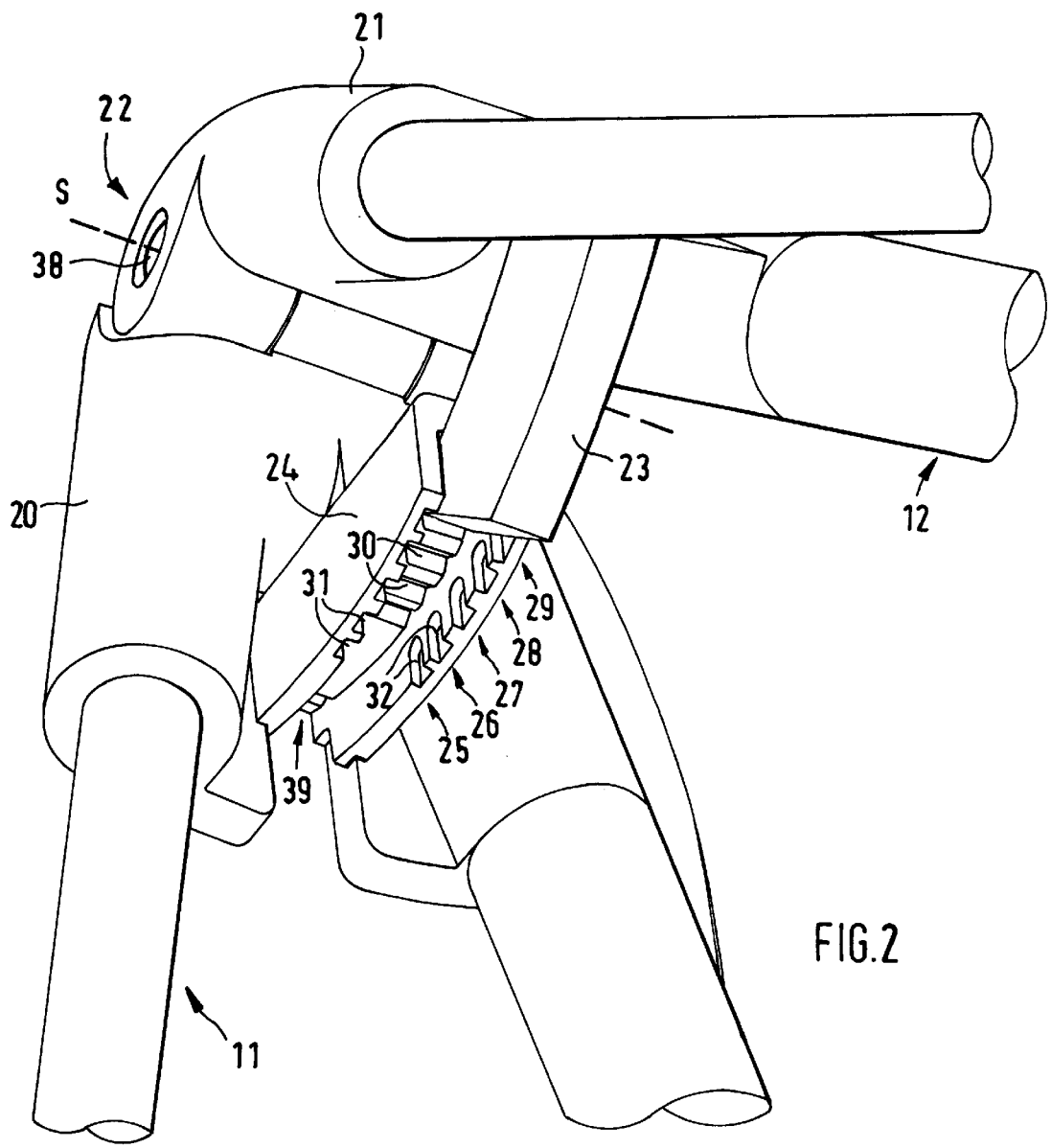
FIG. 2 is a perspective view from below of part of the stand shown in FIG. 1.

The configuration of latch 23 and channel 24 specifically employed in the present, preferred embodiment can be more clearly seen in FIG. 2, which is an enlarged view of the pivot joint showing the channel 24 and the latch 23. The channel 24 extends along a section of a circular arc that is centered on the axis of rotation S. It is positioned below the axis S on the first joint element 20, on the first side 11, and extends toward the second joint element 21, on the second side 12. Correspondingly, the latch 23 is disposed on the second joint element 21, associated with the second side 12, and extends toward the first joint element 20 on the first side, so that the latch 23 projects into the channel 24 and is guided within the latter. The engagement positions 25 to 29 mentioned above are defined within the channel 24 by a plurality of recesses 30, 31, 32, so designed that a latch projection 33, 34 disposed on the latch 23 can plunge into, i.e. engage with, each one of the plurality of the recesses 30, 31, 32.

Figure 3:
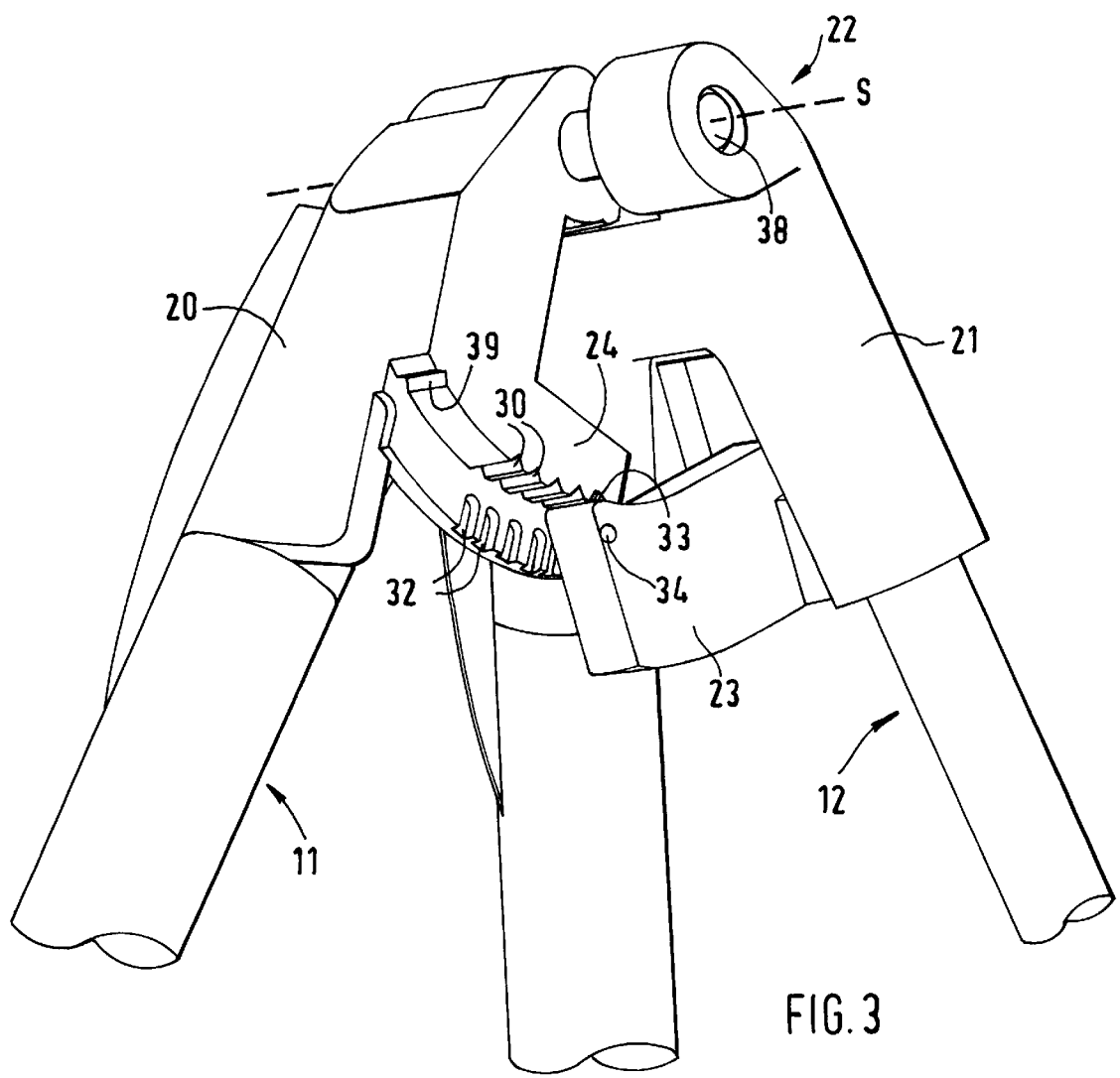
FIG. 3 is a perspective view from one side and in partial section of the same part of the stand shown in FIG. 2 to clarify further the operation of a catch means of the stand.

As can be discerned in FIGS. 2 and 3, various groups of recesses 30, 31, 32 are provided, namely a central group of recesses 30 in the base surface of the channel 24 and lateral groups of recesses 31, 32 in the side surfaces of the channel 24. The central catch recesses 30 are engaged by a latch projection 33 disposed on the latch 23, and the lateral catch recesses 31, 32 are engaged by correspondingly positioned side latch projections 34, as shown in FIG. 3.

In addition, an initial engagement position 39 can be provided, in which the latch 23 is pushed all the way into the channel 24 and the first side 11 and second side 12 are disposed parallel to and a minimal distance apart from one another. By this means the sides 11, 12 are prevented from spreading apart when the musical-instrument stand is in a transport position. When the musical-instrument stand is in the initial engagement position 39 it is kept in the transport position by a predetermined retaining force.

It will be evident that the specific implementation of the catch illustrated in FIGS. 1 to 3 is only one of many possible ways to construct, in the region of the pivot joint 22, a catch capable of releasably locking the guitar stand in at least one pivot position.

What is claimed is:

1. A musical-instrument stand comprising a first side and a second side, each of which defines a lower part and an upper part;
   foot elements provided on the lower part of the first and the second sides for supporting the stand on a floor surface;
   first and second joint elements located in the upper parts of the first and the second sides respectively and together defining a pivot joint that allows the first and the second sides to be pivoted with respect to one another about a predetermined axis of rotation; and
   a releasable catch located in the region of the first and second joint elements and having a plurality of discrete engagement positions for locking the stand in any one of a plurality of different discrete pivot-angle positions corresponding to respective ones of the plurality of the discrete engagement positions of the catch.

2. A musical-instrument stand as claimed in claim 1, wherein the plurality of different pivot-angle positions are equidistant from one another.

3. A musical-instrument stand as claimed claim 1, wherein in one pivot position the first and the second sides are minimally separated from and orientated substantially parallel to one another.

4. A musical-instrument stand as claimed in claim 1, wherein means are provided in the region of the joint elements for limiting the pivot angle in order to make it impossible for the stand to be opened out by more than a predetermined maximal angel.

5. A musical-instrument stand as claimed in claim 1, wherein the catch comprises a latch which is constructed and oriented such that it extends along an arc of a circle concentric with the axis of rotation.

6. A musical-instrument stand as claimed in claim 1, wherein the catch defines a channel with at least one latch recess and comprises an extending latch provided with at least one latch projection.

7. A musical-instrument stand as claimed in claim 1, wherein the catch comprises a first part defining a channel with latch recesses and a second part comprising a latch that is guided in the channel and provided with latch projections.

8. A musical-instrument stand as claimed in claim 7, wherein the latch projections engage in the latch recesses of the channel in a direction radial to the axis of rotation of the pivot joint.

9. A musical-instrument stand as claimed in claim 7, wherein the latch projections engage in the latch recesses of the channel in a direction parallel to the axis of rotation of the pivot joint.

10. A musical-instrument stand as claimed in claim 1, wherein the catch is spaced apart from the axis of rotation of the pivot joint by less than 20 cm.

11. A musical-instrument stand as claimed in claim 1, wherein the catch is spaced apart from the axis of rotation of the pivot joint by less than 15 cm.

12. A musical-instrument stand as claimed in claim 1, wherein the catch is comprised of plastics material.

13. A musical-instrument as claimed in claim 1, wherein each of the first and second sides defines an indented region, the two of which indented regions together define a support on which a musical instrument may be stood.

* * * * *